United States Patent
Kirchen

[11] Patent Number: 5,975,820
[45] Date of Patent: Nov. 2, 1999

[54] TWO-PIECE PIN AND GROMMET

[75] Inventor: James T. Kirchen, Chippewa Falls, Wis.

[73] Assignee: Illinois Tool Works Inc., Glenview, Ill.

[21] Appl. No.: 09/185,449

[22] Filed: Nov. 3, 1998

[51] Int. Cl.[6] .............................. F16B 19/00; F16B 21/00
[52] U.S. Cl. ........................ 411/339; 411/510; 411/908; 411/913
[58] Field of Search ...................................... 411/107, 338, 411/339, 508, 509, 510, 908, 913; 24/297

[56] References Cited

U.S. PATENT DOCUMENTS

| | | |
|---|---|---|
| 4,610,587 | 9/1986 | Wollar et al. . |
| 4,778,320 | 10/1988 | Nakama . |
| 4,840,523 | 6/1989 | Oshida . |
| 4,861,208 | 8/1989 | Boundy .................................... 411/339 |
| 5,011,356 | 4/1991 | Fernandez ............................. 24/297 X |
| 5,319,839 | 6/1994 | Shimajiri . |
| 5,387,065 | 2/1995 | Sullivan . |
| 5,507,610 | 4/1996 | Benedetti et al. . |
| 5,551,817 | 9/1996 | Kanie ................................. 411/339 X |
| 5,580,204 | 12/1996 | Hultman . |
| 5,641,255 | 6/1997 | Tanaka . |
| 5,651,634 | 7/1997 | Kraus . |
| 5,689,863 | 11/1997 | Sinozaki . |
| 5,718,549 | 2/1998 | Noda et al. . |

*Primary Examiner*—Neill Wilson
*Attorney, Agent, or Firm*—Kane, Dalsimer, Sullivan, Kurucz, Levy, Eisele and Richard, LLP

[57] ABSTRACT

The fastener includes a pin and a grommet for attaching a primary panel to a secondary panel. The pin includes two dual-height finger assemblies and a circular flexible flange or umbrella head. A primary panel through a first range of thicknesses is sealingly engaged between the flexible flange and the fingers of a first height of the dual-height finger assemblies, and a primary panel through a second range of thicknesses is sealingly engaged between the flexible flange and the fingers of a second height in the dual-height finger assemblies. The pin further includes a male element with external serrated ridges. The male element engages a passageway in the grommet which includes an internal ridge for engaging the external serrated ridges. The grommet further includes a pair of spaced disks for engaging an opening in a secondary panel.

7 Claims, 5 Drawing Sheets

TWO-PIECE PIN AND GROMMET

BACKGROUND OF THE INVENTION

1. Field of the Invention

The invention pertains to a two-piece pin and grommet, particularly for the fastening of a trim panel to a primary panel. The pin includes a flexible flange which, in combination with dual-height finger assemblies, provides a sealing function.

2. Description of the Prior Art

In the prior art, it is known to provide a flexible flange or umbrella head as a sealing member in a pin and grommet or similar fastening device. A typical use of such a pin and grommet configuration is to secure a secondary panel, such as an automotive trim panel, to a primary panel, such as an automotive body panel. Examples of this include U.S. Pat. No. 5,651,634, entitled "Connection Between a Support and a Plate Element", issued on Jul. 29, 1997 to Kraus and U.S. Pat. No. 5,689,863, entitled "Clip", issued on Nov. 25, 1997 to Sinozaki. With the use of such a flexible flange, as the panel thickness increased, tension would increase until the head flattened. This increased tension resulted in improved sealing characteristics with respect to water, dust and sound. However, with thinner panels, there was less tension and the sealing characteristics degraded. As tooling techniques only allow for a certain amount of flex under the flexible flange or umbrella head, the panel thickness range and sealing capabilities are limited.

Fasteners with multiple height fingers to accommodate a variation in panel thicknesses are likewise known in the prior art, but have not provided adequate sealing such as is necessary in many applications, particularly automotive applications.

OBJECTS AND SUMMARY OF INVENTION

It is therefore an object of this invention to provide a fastener of a pin and grommet configuration for securing a secondary panel to a primary panel.

It is therefore a further object of this invention to provide a fastener of a pin and grommet configuration which has improved sealing characteristics.

It is therefore a still further object of this invention to provide a fastener of a pin and grommet configuration which can accommodate an increased range of primary panel thicknesses.

These and other objects are attained by providing a fastener of a pin and grommet configuration wherein the pin includes a flexible flange or umbrella head which engages the primary panel immediately outwardly adjacent of the periphery of an aperture through which the pin passes. The flexible flange or umbrella head provides a sealing surface against the primary panel. Additionally, the pin includes a circular body with a diameter chosen to pass through the aperture of the primary panel. The pin further includes dual-height finger assemblies so that an increased range of primary panel thicknesses can be engaged while maintaining a strong seal with the flexible flange. A grommet attaches to the secondary panel and further attaches to pin at a variable location.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
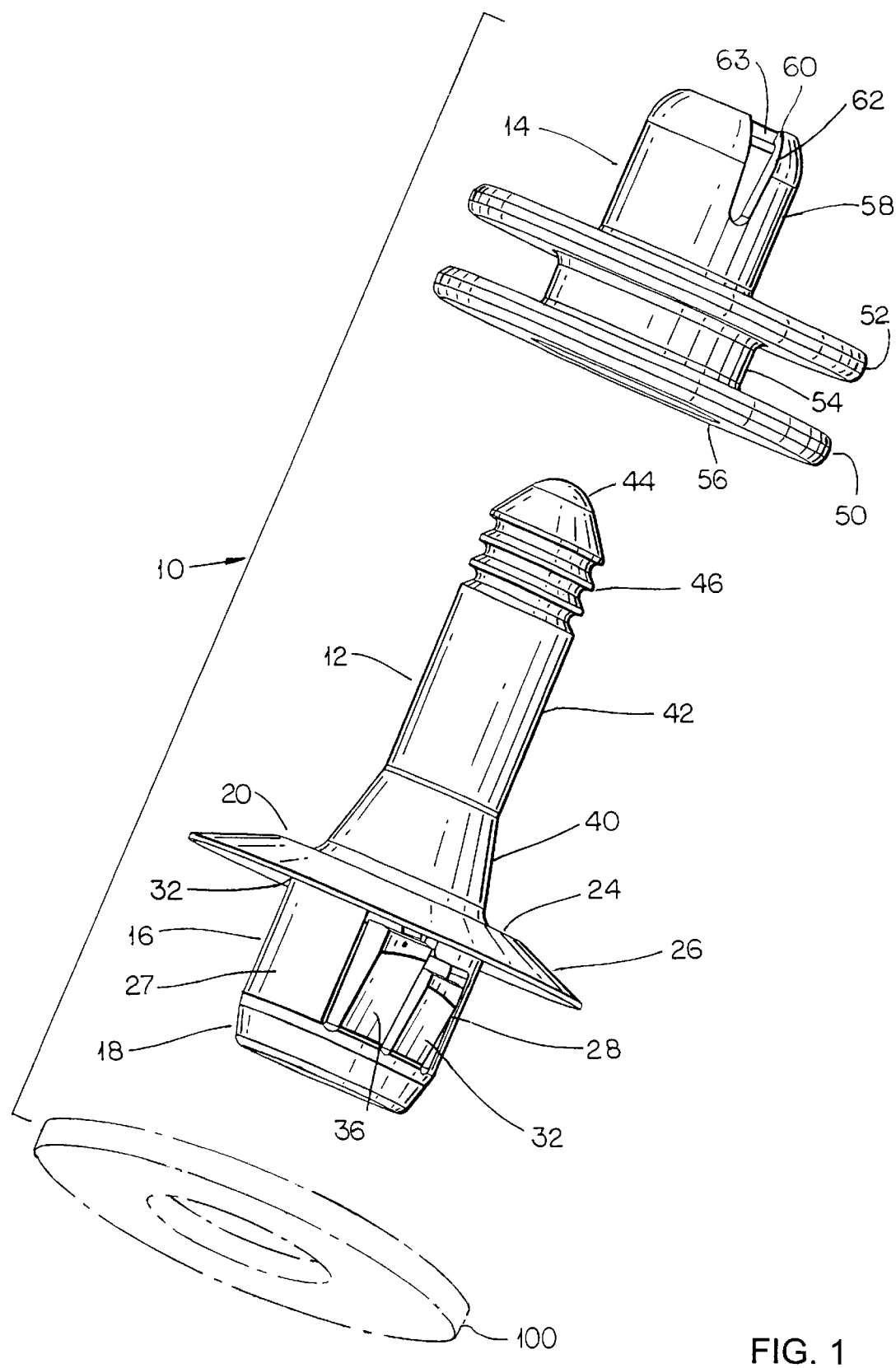
FIG. 1 is an exploded perspective view of the fastener of the present invention, showing the relationship of the pin and grommet, and further showing an optional washer in phantom.
Figure 2:
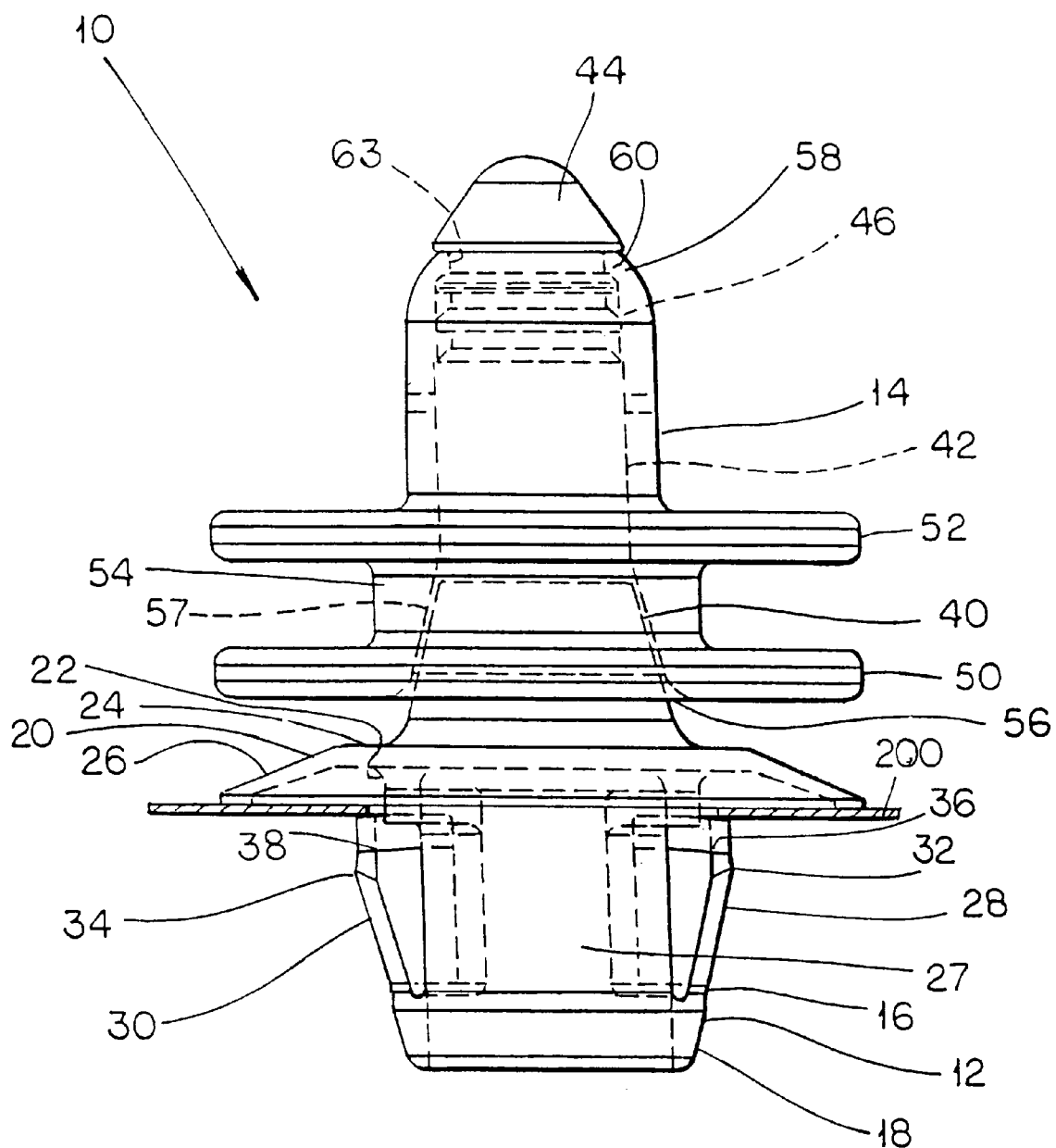
FIG. 2 is a side plan view, partially in phantom, of the fastener of the present invention, showing the pin of the fastener of the present invention engaging a relatively thin primary panel on the upper finger of the dual-height finger configuration.
Figure 3:
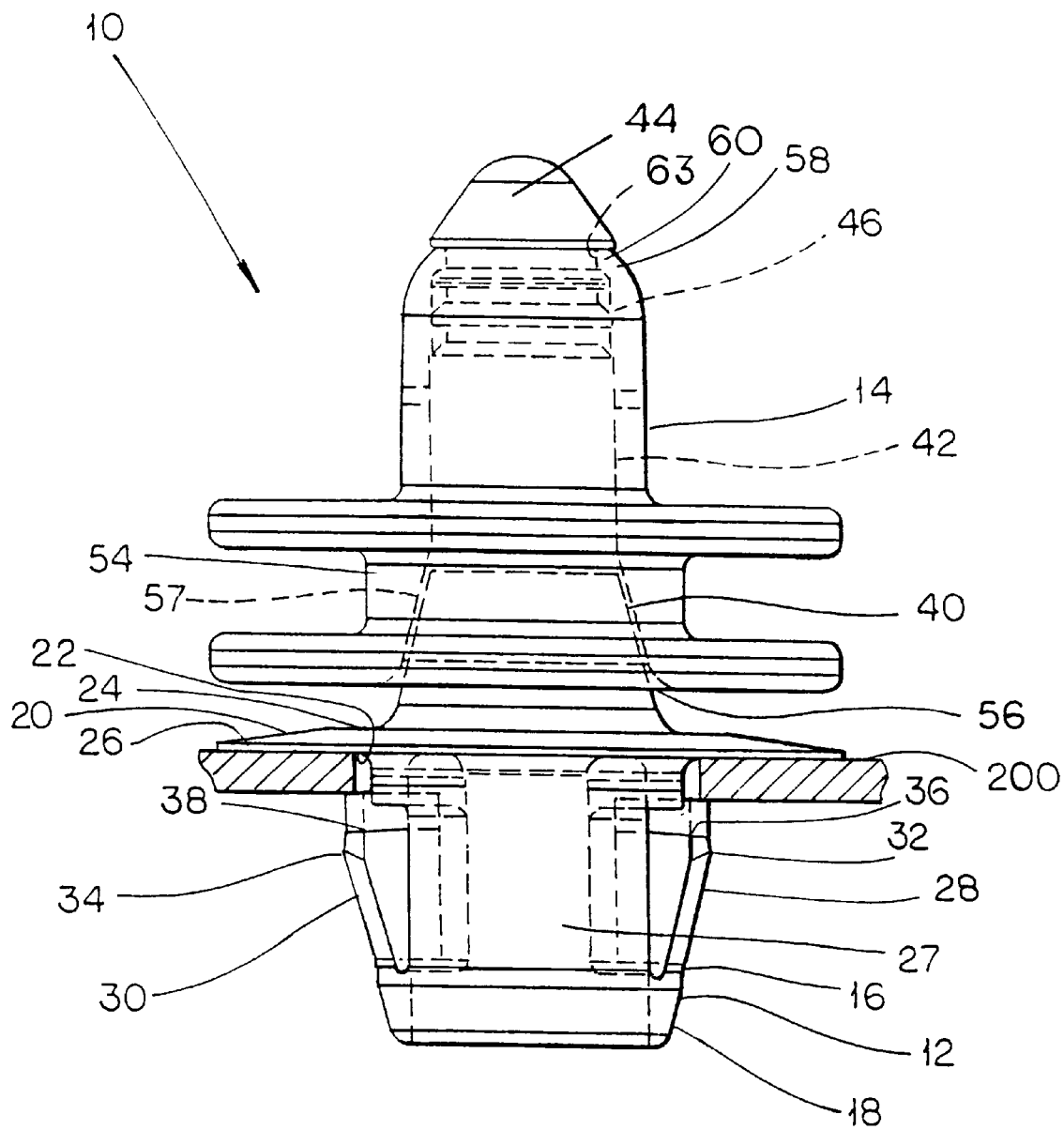
FIG. 3 is a side plan view, partially in phantom, of the fastener of the present invention, showing the pin engaging a relatively thick primary panel on the upper finger of the dual-height finger configuration.
Figure 4:
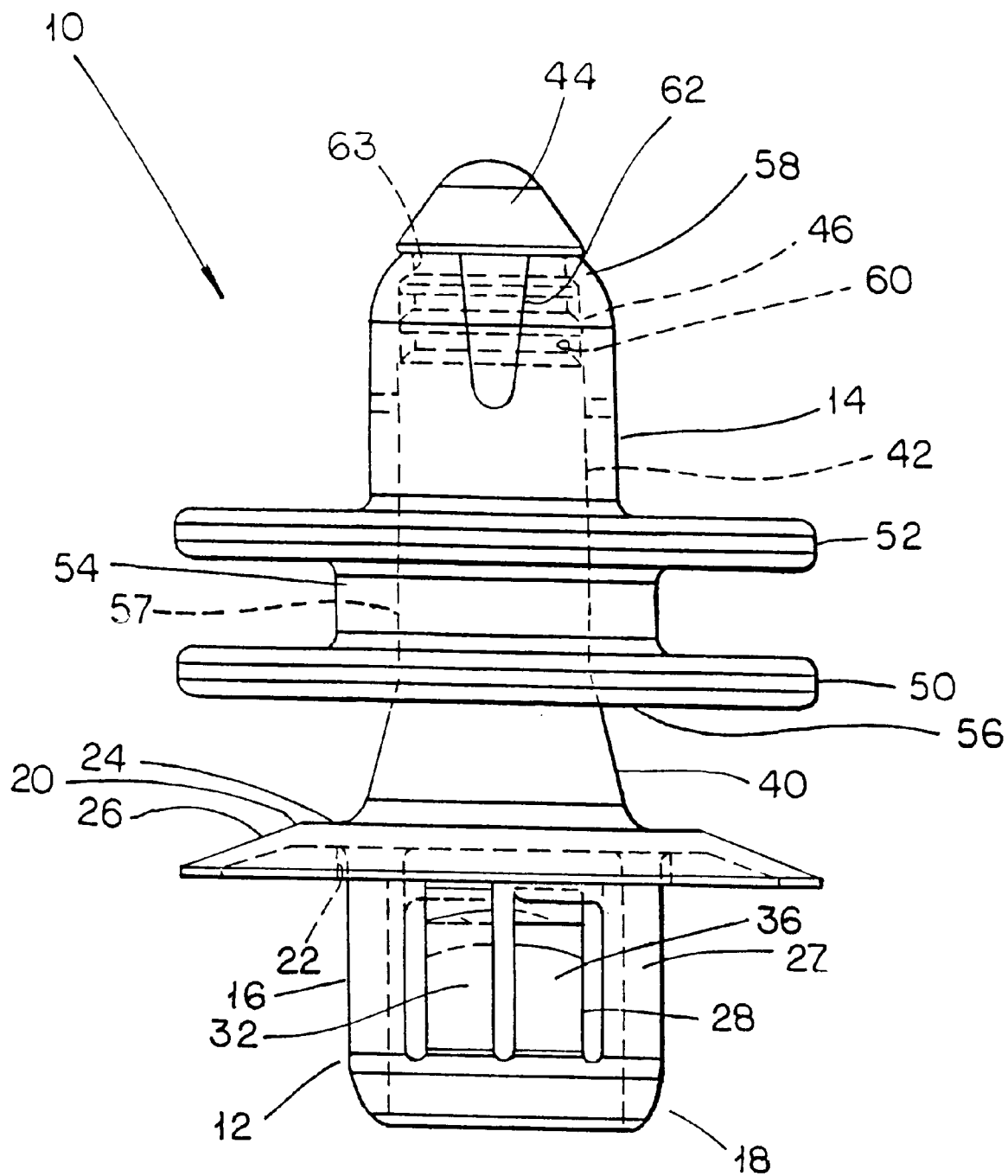
FIG. 4 is a side plan view, partially in phantom, of the fastener of the present invention, showing the flexible flange in an unflexed position and showing a front view of the dual-height finger configuration.
Figure 5:
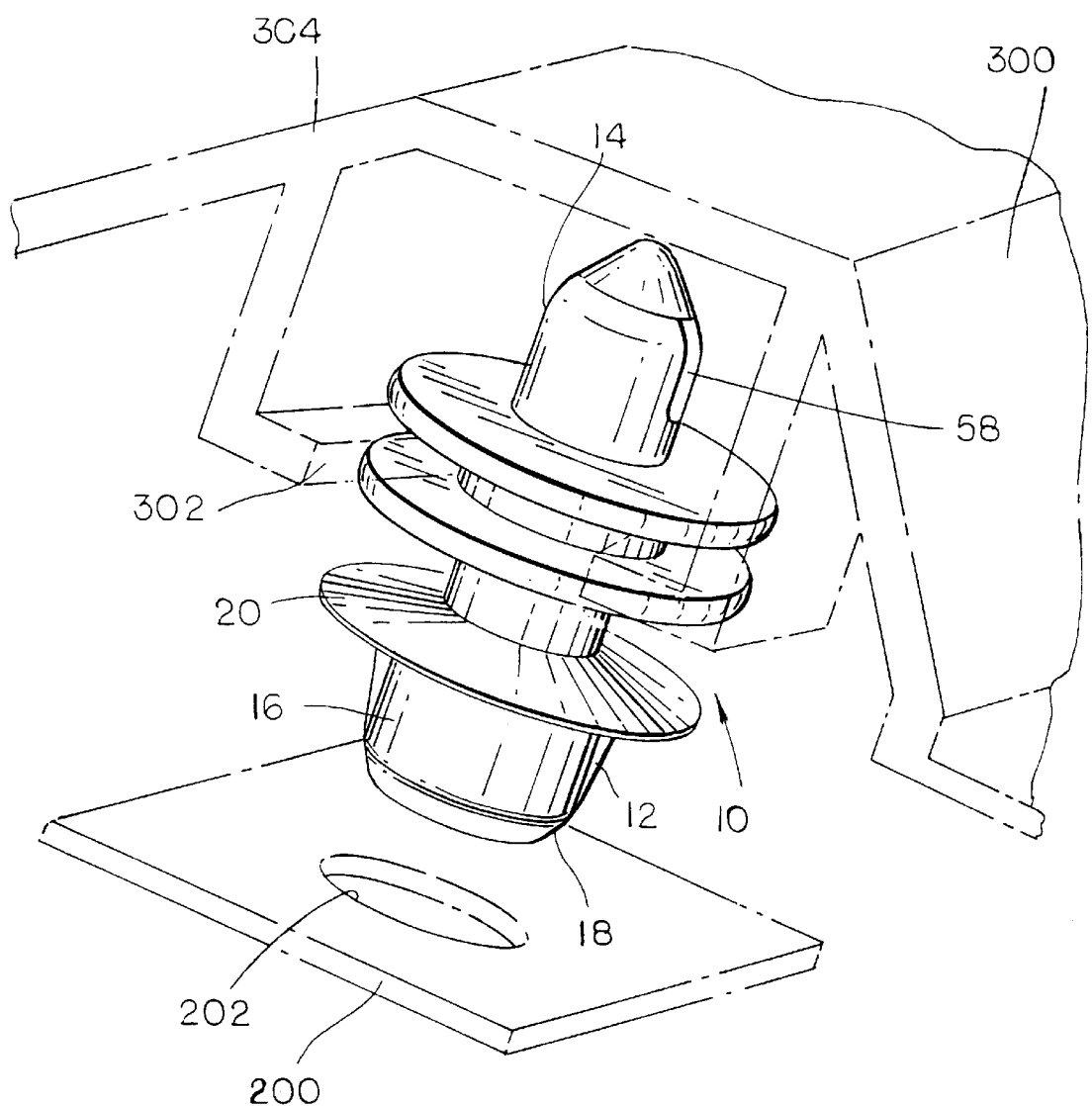
FIG. 5 is a perspective view of the fastener of the present invention, showing the pin engaging a primary panel and the grommet engaging a secondary or trim panel.

Referring now to the drawings in detail wherein like numerals refer to like elements throughout the several views, one sees that FIG. 1 is an exploded perspective view of fastener 10, including pin 12 and grommet 14. Additionally, optional washer 100 is shown in phantom. Pin 12 includes lower cylindrical base 16 with a lower circular chamfered edge 18. The diameter of cylindrical base 16 is chosen to be inserted through aperture 202 in primary plate 200 as shown in FIGS. 2, 3 and 5. Saucer-shaped flexible flange 20 if formed at the upper edge 22 of cylindrical base 16. Flexible flange 20 includes a relatively horizontal section 24 (from the orientation of FIGS. 2, 3 and 4) which engages to the periphery of upper edge 22 of cylindrical base 16. Horizontal section 24 further supports downwardly extending umbrella section 26.

Opposed sides of the cylindrical wall 27 of base 16 further include dual-height finger assemblies 28, 30. Dual-height finger assemblies 28, 30 include lower fingers 32, 34, respectively, immediately adjacent to upper fingers 36, 38, respectively. Fingers 32, 34, 36, 38 are formed from the material of cylindrical wall 27 and extend upwardly and outwardly therefrom so as to point toward flexible flange 20. Fingers 32, 34, 36, 38 further have sufficient elasticity so as to be urged toward cylindrical wall 27 as cylindrical base 16 is pushed through aperture 202 of primary panel 200 and then spring outwardly to an engaged position immediately outwardly adjacent from aperture 202 of primary panel 200 such as is shown in FIGS. 2 and 3.

As shown in FIGS. 2, 3 and 5, primary plate 200 is engaged from above by flexible flange 20 and from below by either upper fingers 36, 38 (as shown in FIGS. 2 and 3) or lower fingers 32, 34. As further shown in FIGS. 2 and 3, there is a limited range of thicknesses of primary panel 200 which can be accommodated by any one pair of fingers and flexible flange 20. FIG. 2 illustrates a relatively thin primary panel 200 engaged by upper fingers 36, 38 and flexible flange 20 wherein flexible flange 20 is not strongly pressed against primary panel 200 and a seal for particular applications is formed. FIG. 3 illustrates a relatively thick primary panel 200 engaged by upper fingers 36, 38 and flexible flange 20 wherein flexible flange 20 is strongly pressed against primary panel 200 to the extent that flexible flange 20 has flattened near the level of horizontal section 24 and a relatively strong seal is formed. FIG. 3 illustrates the maximum thickness of primary panel 200 that can be effectively engaged by upper fingers 36, 38 while maintaining a seal between flexible flange 20 and primary panel 200. However, by engaging primary panel 200 between flexible flange 20 and lower fingers 32, 34, a range of increased thicknesses of primary panel 200 can be effectively engaged while maintaining a seal of sufficient strength. Washer 100, shown in phantom in FIG. 1, may be optionally used in combination with fastener 10, and is typically placed between the interior portion of flexible flange 20 and primary panel 200.

Immediately above cylindrical base 16 and flexible flange 20 is inwardly sloping conical wall 40 which leads to cylindrical male element 42. The tip 44 of cylindrical male element 42 is rounded and is upwardly adjacent from external serrated ridges 46.

Grommet 14 includes lower and upper toroidal heads 50, 52 which are parallel to each other and spaced apart by cylindrical member 54. Cylindrical member 54 is hollow and lower toroidal head 50 is likewise hollow thereby forming passageway 56 through which pin 12 passes and is engaged. The lower portion of passageway 56 includes inwardly tapering wall 57 which is complementary to inwardly sloping conical wall 40 (see FIGS. 2 and 3). Passageway 56 extends into the tip 58 of grommet 14 with a shape complementary to cylindrical male element 42 and includes internal ridge 60 (see FIGS. 2 and 3) which engages external serrated ridges 46 of cylindrical male element 42. Passageway 56 terminates in aperture 63 which is bounded by internal ridge 60 and through which tip 44 of pin 12 passes in the installed position. The plurality of external serrated ridges 46 allows for engagement to internal ridge 60 through a range of relative positions of pin 12 and grommet 14.

Tip 58 includes longitudinal slot 62 which traverses internal ridge 60 and provides access to internal ridge 60. This allows for cleaning of internal ridge 60 and may allow the user to separate internal ridge 60 from external serrated ridges 46.

In order to use fastener 10, the user typically engages lower and upper toroidal heads 50, 52 of grommet 14 about both sides of an aperture or slot 302 of secondary or trim panel 300 as shown in a doghouse configuration 304 in FIG. 5. The user additionally urges cylindrical base 16 of pin 12 through aperture 202 of primary panel 200 and optionally through washer 100. The user positions pin 12 so that either upper fingers 36, 38 or lower fingers 32, 34 snap engage against primary panel 200 at an appropriate position so that flexible flange 20 is flexed to an extent that a seal is formed between flexible flange 20 and primary panel 200. The fastener 10 may be supplied to the user with the uppermost external serrated ridge 46 engaged against the internal ridge 60. In such a configuration, the user then merely forces grommet 14 downward, if necessary, so that internal ridge 60 engages the desired external serrated ridge. However, if the pin 12 and grommet 14 are supplied to the user separately, the user then inserts tip 44 of element 42 of pin 12 into passageway 56 of grommet 14 and urges secondary or trim panel 300 toward primary panel 200 so that internal ridge 60 of passageway 56 engages external serrated ridges 46 of cylindrical male element 42 at an appropriate position along the range of possible engagements therebetween.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A fastener including:

a pin and a grommet;

said pin including a cylindrical base to engage an opening in a first panel, said cylindrical base including at least one first detent finger and at least one second detent finger, said pin further including a circular flange of flexible material extending outwardly from said cylindrical base and toward said at least one first detent finger and said at least one second detent finger;

said at least one first detent finger being spaced from said circular flange by a first distance and said at least one second detent finger being spaced from said circular flange by a second distance, said first distance being different from said second distance;

said pin further including a cylindrical element with a first attachment element;

said grommet including a passageway with a second attachment element for engaging said first attachment element of said pin, said grommet further including means for attaching to a second panel.

2. The fastener of claim 1 wherein said circular flange flexes throughout a range in order to sealingly engage a first range of thicknesses of a first panel between said circular flange and said at least one first detent finger and to sealing engage a second range of thicknesses of a first panel between said circular flange and said at least one second detent finger.

3. The fastener of claim 2 wherein said at least one first detent finger includes two first detent fingers at opposed positions about a periphery of said cylindrical base, and wherein said at least one second detent finger includes two second detent fingers at opposed positions about a periphery of said cylindrical base.

4. The fastener of claim 3 further including two finger assemblies at opposed positions about a periphery of said cylindrical base, each finger assembly including one of said first detent fingers peripherally adjacent to one of said second detent fingers.

5. The fastener of claim 4 wherein said first attachment element and said second attachment element are ridges.

6. The fastener of claim 5 wherein said means for attaching to a second panel includes two substantially parallel disks separated by a cylindrical spacer.

7. The fastener of claim 6 wherein said passageway passes through said two disks and through said cylindrical spacer.

* * * * *